Dec. 5, 1939.   J. M. SINCLAIR   2,182,240
MEANS FOR KEYING PUMP IMPELLERS TO DRIVING SHAFTS
Filed Sept. 6, 1938
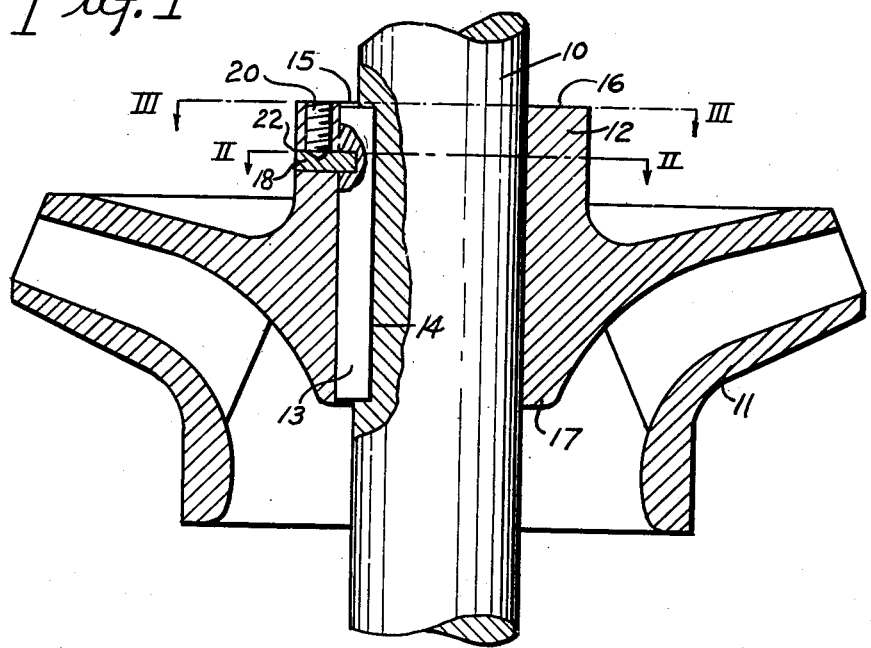
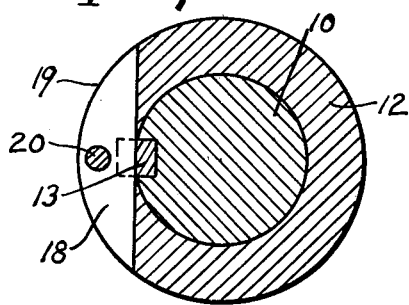
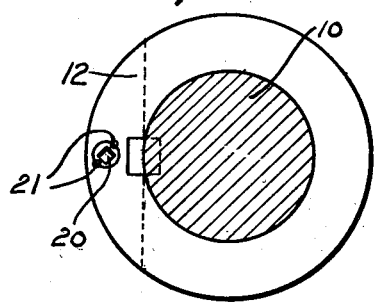
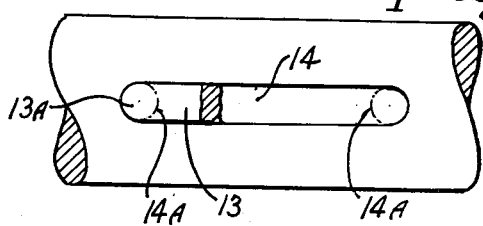
INVENTOR
JOHN M. SINCLAIR
By J. H. Weatherford
Atty.

Patented Dec. 5, 1939

2,182,240

UNITED STATES PATENT OFFICE 2,182,240

MEANS FOR KEYING PUMP IMPELLERS TO DRIVING SHAFTS

John Morton Sinclair, Memphis, Tenn., assignor to Layne and Bowler, Incorporated, Memphis, Tenn., a corporation of Delaware Application September 6, 1938, Serial No. 228,605

3 Claims. (Cl. 287—52.05)

This invention relates to means for keying a pump impeller or the like to a driving shaft.

In securing a pump impeller in particular to a driving shaft, it is essential that the impeller not only be secured to the shaft so that it must turn therewith, but that it be anchored against longitudinal movement along the shaft, and it is further essential that not only shall this be true, but that there shall be no shifting of the key by which these instrumentalities are secured together, with reference either to the shaft or the hub, particularly where one face of the hub may abut against a shaft bearing.

The primary object of the invention is to secure a pump impeller or the like to a driving shaft against both driving strain and longitudinal displacement.

The means by which this object is accomplished and the methods of its accomplishment will readily be understood from the following specification on reference to the accompanying drawing, in which:

Fig. 1 is a section of a typical pump impeller in place on a driving shaft with a driving key locked against displacement along the shaft and with reference to the hub of the impeller.

Fig. 2 is a section of the hub and shaft taken on the line II—II of Fig. 1;

Fig. 3 is a plan of the impeller hub with the shaft in section along the face of the hub; and Fig. 4 is an elevation of the shaft showing the key-way and a portion of a key in place.

Referring now to the drawing in which the various parts are indicated by numerals:

10 is a shaft. 11 is a pump impeller having a hub 12 closely embracing the shaft 10. 13 is a key which is disposed in a complementary key-way 14 channelled in usual manner in the shaft. The ends of both the key and key-way are abrupt, the key being of such length that it fits snugly between the abrupt ends of the key-way and is held by such ends against longitudinal displacement. A portion of the key projects in usual manner beyond the surface of the shaft and engages the usual key-way 15 in the hub 12. Preferably the length of the key is slightly less than the length of the hub in order that neither end of the key may project beyond the hub and that the face 16 or the face 17 of the hub may abut against a shaft bearing should it be so desired.

18 is a transverse feather which is disposed in a slot in the hub 12 and engages a notch in the key 13 locking the hub and key against relative longitudinal displacement. The exterior surface 19 of the feather 18 is of arcuate shape conforming closely to the exterior shape of the hub 12.

20 is a headless set screw which is tapped into the hub 12, the point of the set screw engaging a suitable indentation or hole in the feather 18. After it is screwed to place, punch marks 21 are made along the junction line of the set screw and the hub in the end of the set screw and face of the hub to secure the set screw against backing out. Additionally, if desired, the feather and the hub 12 may be further secured together along the arcuate junction lines, as the line 22, by brazing.

In accomplishing the structure the shaft is channelled, as at 14, in usual manner, this ordinarily being done by drilling holes 14—A defining the opposite ends of the key-way and channelling therebetween. The key 13 having complementary rounded ends 13—A is seated in the key-way with substantially half the depth of the key projecting as is usual beyond the shaft. The key-way 15 is cut in usual manner in the hub of the impeller and the impeller placed on the shaft with the key-way therein engaging the key, the hub, as before stated, being preferably slightly longer along the shaft than the key. A channel-way is cut in the hub and the key to receive the transverse key 18. A hole is drilled and tapped in the hub for the set screw 20. The feather 18 of segmental shape is then forced into the channel cut in the hub and key to lock the hub and key together and preferably the feather is counter-sunk or drilled to receive the point of set screw. The set screw 20 is then put in place and set up tight and punch marks made around the circumference of the head of the screw to prevent its loosening. The feather may then be brazed along the junction lines with the hub and such finishing be done as is desired.

It will be particularly noted that in this construction there are no protruding surfaces and that substantially all material removed for keyways, slots, and screws is replaced by other materials and a minimum interference with running balance is maintained.

I claim:

1. A shaft and a hub mounted thereon and having key-ways in register, a snugly fitting key disposed in said key-ways and locking said hub and shaft against relative turning movement, said key having a shaft engaging portion complementary to said shaft key-way, said portion and said key-way being shaped to interengage and prevent longitudinal displacement of said key; said hub and said key being transversely slotted to form a channelway, a feather forced into said channelway and locking said key and hub against relative longitudinal displacement, and means substantially permanently securing said feather in said slot, said key, said feather and said securing means all lying within the limits of the opposite ends of said hub.

2. A shaft and a hub mounted thereon and having key-ways in register, a snugly fitting key disposed in said key-ways and locking said hub and shaft against relative turning movement, said key having a shaft engaging portion complementary to said shaft key-way, said portion and said key-way being shaped to interengage and prevent longitudinal displacement of said key; said hub and said key being transversely slotted to form a channelway, a feather forced into said channelway and locking said key and hub against relative longitudinal displacement, and means substantially permanently securing said feather in said slot.

3. A shaft and a hub mounted thereon and having key-ways in register, a snugly fitting key disposed in said key-ways and locking said hub and shaft against relative turning movement, said key having a shaft engaging portion complementary to said shaft key-way, said portion and said key-way being shaped to interengage and prevent longitudinal displacement of said key; said hub and said key being transversely slotted to form a channelway, a feather forced into said channelway and locking said key and hub against relative longitudinal displacement, said hub having a hole substantially at right angles to said feather and a pin disposed in said hole and interengaging with said feather to prevent displacement thereof, said pin being substantially permanently secured against accidental displacement.

JOHN MORTON SINCLAIR.